United States Patent Office 3,210,881
Patented Oct. 12, 1965

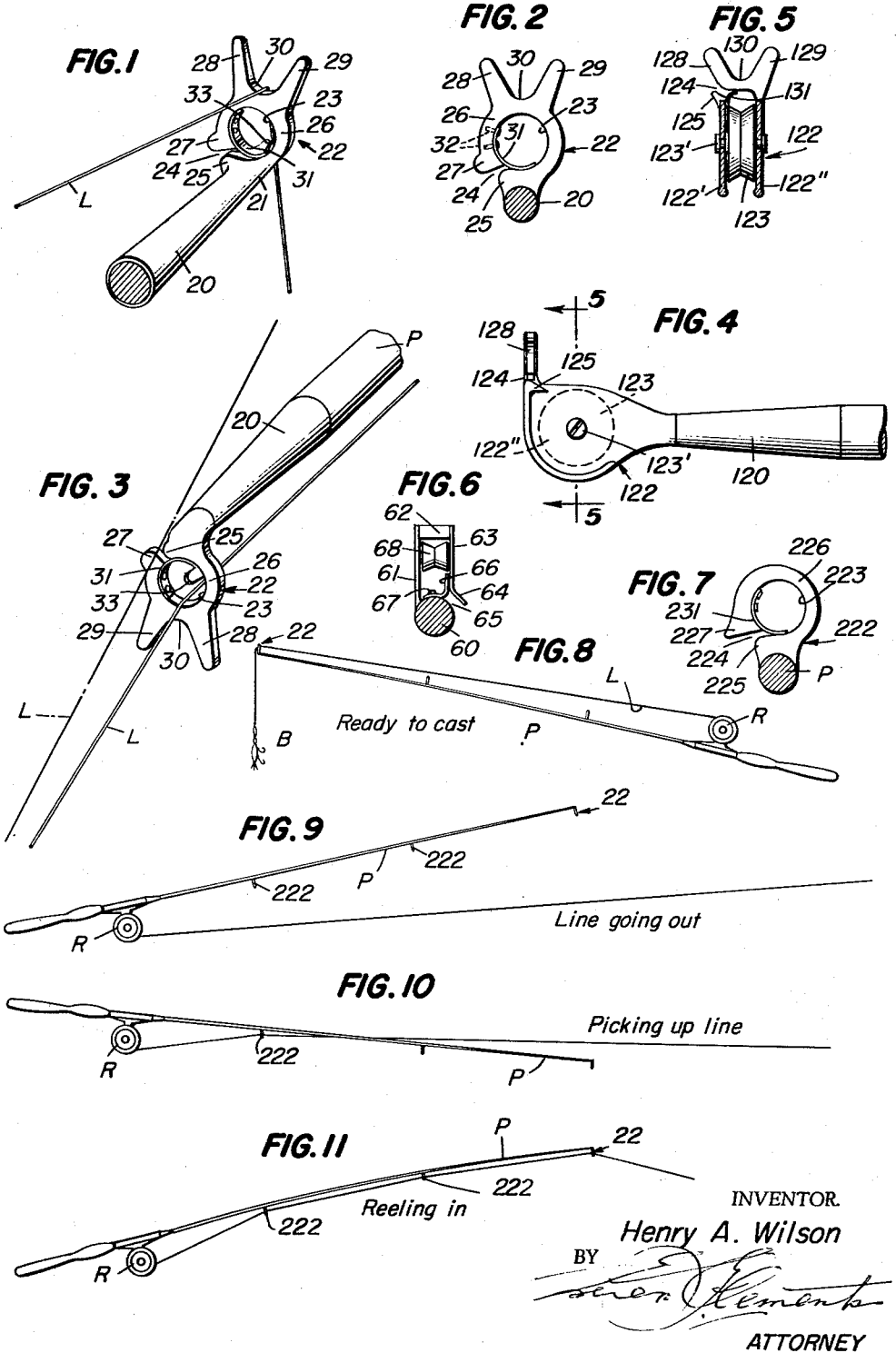

3,210,881
CENTRIFUGAL FREE LINE PROJECTING POLE
AND LINE GUIDE THEREFOR
Henry A. Wilson, 333 S. Gulfview Blvd.,
Clearwater Beach, Fla.
Filed Dec. 19, 1962, Ser. No. 245,691
8 Claims. (Cl. 43—24)

This invention relates to a combined casting guide and self-threading line guide for a fishing pole.

For casting, it is desirable that there be a minimum of frictional interference with the line as it is paid out. To accomplish this, the device of this invention is provided with a portion engageable with the line for whipping it forwardly during casting but immediately freeing the line to run directly from the reel. In order to guide and control the line after casting, and during reeling, the device of this invention is provided with an escape proof self-threading guide eye which engages the line by a simple manipulation of the pole.

An object of this invention is the provision of a line guide for the end of a fishing pole which has a portion releasably retaining the line for casting and another portion for picking up the line after casting.

A further object of this invention is the provision of a self-threading line guide on a pole and having means to pick up the line by simple manipulation of the pole.

An additional object of the invention is the provision of means to prevent accidental escape of the line from the guide eye once said line has been picked up and entrapped by said guide eye.

Another object of this invention is the provision of a guide eye which renders unnecessary the usual plurality of guides along a fishing pole.

The above and other objects will be apparent from a consideration of the following specification taken with the accompanying drawings which together form a complete disclosure of my invention.

In the drawings:

FIG. 1 is a perspective view of my novel line guide showing a line in casting position;

FIG. 2 is a face view, partially in section, of the guide;

FIG. 3 is a perspective view of the guide showing how a line is picked up;

FIG. 4 is a side elevation of a modified form of guide means with my threading means;

FIG. 5 is a section on the line 5—5 of FIG. 4;

FIG. 6 is a section through a fishing pole and showing a fragmentary face view similar to FIG. 2, of a modified form of guide means;

FIG. 7 is a section through a fishing pole and showing a fragmentary face view of a self-threading guide, without the casting rest, and adapted particularly for use intermediate the ends of the fishing pole;

FIG. 8 shows a pole having the guide of FIGS. 1–3 ready for casting;

FIG. 9 shows the line being paid out;

FIG. 10 shows the line being picked up; and

FIG. 11 shows the line in reeling in position.

Referring now to FIGS. 1 to 3, there is shown a ferrule-type tip having an inner sleeve member 20 adapted to be applied to the end of a fishing pole P. The member 20 is preferably tubular and tapered toward its outer end 21 whereon I provide my novel combined guide means 22. The outer end 21 of the member 20 is solid as shown in FIG. 2. The guide 22, which preferably is integral with the tip member or sleeve 20, comprises a generally circular line receiving and guiding eye portion 23 having a laterally open free line threading or pick-up slot 24 adjacent one side of the sleeve end 21. A portion of the sleeve 21 is formed into a lip 25, and spaced therefrom a portion of the wall 26 of the eye 23 is formed as an enlarged co-operating free line catching and guiding lip member 27. The lips 25 and 27 thus form the entrance to the threading slot 24 which extends generally normal to the V-shaped free line supporting and casting guide now to be described.

About diametrically opposite the sleeve 20, the outer end of the guide 22 is formed with a pair of free line guiding and casting horns 28, 29, forming therebetween an outwardly open rounded V 30. As will be understood from FIGS. 1 and 8 the free end portion of the uncaptured fishing line is first led out from the usual reel R from the inner handle end of the rod and thence over the outwardly open V notch 30 between the line supporting horns 28 and 29 so as to be freely catapulted away from the rod. This is shown in FIG. 9. After the lure has settled into the water at some distance point the freely extending fishing line may be quickly and readily picked up into the line guides 22–222 of my improved fishing rod as shown particularly in FIGS. 10 and 11 by a simple manipulation of the rod. In order to prevent accidental escape of the line L from the guide 22, when once picked up therein after casting a curved spring latch means 31 extends over the slot 24, and is fastened by a pair of screws or rivets 32. The free end of the spring 31 is provided with a finger piece 33, by which it may be lifted to permit freeing of the line L.

In FIGS. 4 and 5, the principle of my invention is shown as applied to a roller type line guide. Here the sleeve 120 has a bifurcated end 122 for supporting a roller guide 123 having a V-shaped periphery is rotatably mounted on a pin 123' mounted in the furcations 122' and 122''. Horns 128 and 129 form a rounded V 130. The slot 124, leading into the guide 123, is located between the horn 128 and the lip 125 formed on the furcation 122'. A spring 131, suitably mounted on the furcation 122', bridges the slot 124 to prevent accidental escape of a line L.

In FIG. 6, there is shown a further modified form of a line guide for the rod 60 of my invention. A bar 61 is attached to this member 60 and has a short cross bar 62 at its outer end. A second bar 63, parallel to the bar 61 is attached to or is integral with the cross bar 62 and terminates short of the rod 60, with an outwardly turned end 64, forming a gap 65 therebetween and the rod 60. A spring 66 attached to the rod 60 by means of a rivet 67 bridges the gap 65 to prevent accidental escape of a line L. A roller 68 having a wide V-shaped periphery is rotatably mounted between the bars 61 and 63.

In FIG. 7 I show a further modified form of a guide particularly designed for mounting along a fishing pole P. The guide 222 has a circular eye 223 and a threading gap 224. A portion of the guide 222, adjacent the pole P is formed into a lip 225 adjacent the gap 224. A portion of the wall 226 of the eye 222 is formed into a threading lip 227 adjacent the slot 224. The lips 225 and 227 form the entrance to the slot 224.

It should here be noted that the lips 27 and 227 are longer than the lips 25 and 225 for a purpose later to appear.

In operation the line L is placed in the V 30 or 130 with the lure B suspended below the end of the pole P as shown in FIG. 8. The line L extends directly to the reel R. The pole P is then swung vigorously upwardly and forwardly and, the reel R being free, pays out into the fishing area as shown in FIG. 9. After casting, the pole is manipulated so that a guide 222 is brought under the line L wherein, when the lip 227 engages the line L, tension will cause it to slip into the guide 222, as shown in FIG. 10. One or more further guides 222 are threaded as above, then the pole is manipulated so that the tip guide 22 is brought under the line L with the lip 27 in engagement with the line. Tension then causes the line to enter the eye 23.

In FIG. 3 the line L is shown in dash lines as being engaged by the lip 27, and as it would be engaged by the lip 64 or the lip 125 or the lip 227, and in solid lines in the eye 23.

Having now described my invention and the manner of its use, I desire it to be understood that departures may be made within the skill of the art and the scope of the append claims.

I claim:

1. In a fishing line casting and reeling device including a casting rod having a free end, a combined free line supporting, casting and line pick-up and guiding means on the free end of said rod including a substantially annular wall, diverging horns on said wall forming a substantially V-shaped open sided guide for said line in casting same free thereof, said wall having a slot therethrough and extending substantially normal to said V-shaped open sided guide and having lips projecting from opposite sides of said slot, one lip being longer than the other to be brought under said freely extended line to guide it into said slot by rotary manipulation of said rod, and spring means bridging said slot to prevent accidental displacement of said line.

2. A fishing rod having an open continuous integral V-shaped free line supporting and casting guide providing horns projecting outwardly and laterally of the rod axis from the tip end of the rod, and a self-threading, line pick-up and confining guide means mounted adjacent the base of one of said horns, said guide means extending completely around a fishing line adapted to run therethrough and said guide means including means providing a lateral opening for entry of the fishing line therein.

3. The structure recited in claim 2 wherein said casting guide horns and said line confining guide means comprises a unitary structure in which the line openings thereto are disposed substantially normal to each other.

4. The structure as defined in claim 2 wherein said lateral line pick-up guide opening is provided with spaced lips, one being longer than the other and extending substantially normal to said V-shaped guide horns.

5. The structure recited in claim 2 wherein the opening in said line pick-up and confining guide means comprises a slot, and latch means bridging said slot.

6. The structure recited in claim 5 wherein the latch bridging the slot is a spring leaf having one end thereof attached to the inner surface of the guide means at one side of said slot and the other end being free to engage the inner surface of the guide means on the opposite side of said slot.

7. The structure defined in claim 6 wherein said line guide means comprises a rotary guide element.

8. The structure as defined in claim 6 wherein said line guide horns project outwardly from one side of said line pick-up and confining guide means.

References Cited by the Examiner

UNITED STATES PATENTS

| D. 101,236 | 9/36 | Meyerson. | |
| 831,991 | 9/06 | Pyle | 24—236 |
| 863,606 | 8/07 | Hoerle | 43—24 |
| 1,034,755 | 8/12 | Baker | 24—236 |
| 1,157,106 | 10/15 | Heinrich | 43—24 |
| 1,181,668 | 5/16 | Johnson | 43—17 |
| 2,525,948 | 10/50 | Ruiz | 43—24 X |
| 2,863,252 | 12/58 | Hettinger | 43—24 |

FOREIGN PATENTS

| 7,459 | 1908 | Great Britain. |
| 729,702 | 5/55 | Great Britain. |

SAMUEL KOREN, *Primary Examiner.*